US009302870B2

(12) United States Patent
Kim

(10) Patent No.: US 9,302,870 B2
(45) Date of Patent: Apr. 5, 2016

(54) DRUG PACKAGE WINDING APPARATUS

(75) Inventor: Jun-Ho Kim, Daegu (KR)

(73) Assignee: JVM CO., LTD, Daegu (KR)

( * ) Notice: Subject to any disclaimer, the term of this patent is extended or adjusted under 35 U.S.C. 154(b) by 335 days.

(21) Appl. No.: 13/996,063

(22) PCT Filed: Dec. 8, 2011

(86) PCT No.: PCT/KR2011/009466
§ 371 (c)(1), (2), (4) Date: Jun. 20, 2013

(87) PCT Pub. No.: WO2012/086953
PCT Pub. Date: Jun. 28, 2012

(65) Prior Publication Data

US 2013/0264376 A1 Oct. 10, 2013

(30) Foreign Application Priority Data

Dec. 21, 2010 (KR) ........................ 10-2010-0131712

(51) Int. Cl.

| | |
|---|---|
| ***B65H 18/08*** | (2006.01) |
| ***B32B 38/04*** | (2006.01) |
| ***B65B 9/08*** | (2012.01) |
| ***B65B 51/06*** | (2006.01) |
| ***B65B 61/08*** | (2006.01) |
| ***B65B 63/04*** | (2006.01) |
| ***B65C 1/02*** | (2006.01) |
| *B65B 5/10* | (2006.01) |

(52) U.S. Cl.
CPC *B65H 18/08* (2013.01); *B65B 9/08* (2013.01); *B65B 51/06* (2013.01); *B65B 61/08* (2013.01); *B65B 63/04* (2013.01); *B65C 1/021* (2013.01); *B65B 5/103* (2013.01)

(58) Field of Classification Search
CPC ........ B65B 5/103; B65B 51/06; B65B 61/08; B65C 1/021; Y10T 156/1322
See application file for complete search history.

(56) References Cited

U.S. PATENT DOCUMENTS 6,330,351 B1 * 12/2001 Yasunaga ........... G01N 21/9508
235/375

FOREIGN PATENT DOCUMENTS

| | | | |
|---|---|---|---|
| JP | 10016905 | A | 1/1998 |
| JP | 2005015003 | A | 1/2005 |
| JP | 2010083538 | A | 4/2010 |
| KR | 100315996 | B1 | 12/2001 |
| KR | 100599506 | B1 | 7/2006 |

* cited by examiner

*Primary Examiner* — Mark A Osele
*Assistant Examiner* — Christopher C Caillouet
(74) *Attorney, Agent, or Firm* — Novick, Kim & Lee, PLLC; Jae Youn Kim

(57) ABSTRACT

A drug package winding apparatus is provided. The drug package winding apparatus includes a drug package introducing unit to introduce a drug package, which is formed by packaging a great amount of drugs in a unit of a single pack having a dose of drugs and is not individually divided into single packs, into a body, a drug package winding unit to wind the drug package introduced into the drug package introducing unit, a drug package cutting unit to cut a boundary between one side pack and an opposite side pack of the drug package wound by the drug package winding unit, a sticker attaching unit to attach a sticker to an end portion of the drug package cut by the drug package cutting unit, and a drug package discharge unit to discharge the drug package having the sticker by the sticker attaching unit.

15 Claims, 11 Drawing Sheets

DRUG PACKAGE WINDING APPARATUS

TECHNICAL FIELD

The present invention relates to a drug package winding apparatus. In more particular, the present invention relates to a drug package winding apparatus capable of winding and cutting the packages of drugs, which are continuously packaged in large quantity based on prescriptions, according to patients, and attaching a sticker to the cut drug package to make a bundle of a wound drug package roll.

BACKGROUND ART

In general, a hospital or a pharmacy provides drugs to a patient according to the prescription of a doctor.

In particular, since a chronic patient must usually take the same drug every day for a long time, the patient simultaneously receives all prescription drugs to be taken for a long time at a time. For example, as a hypertense or a diabetic patient takes the same drug every day, the hypertense or the diabetic patient simultaneously receives a great amount of prescription drugs to be taken for one month from at least three months.

In this case, the dose of prescription drugs is put into a drug pack having the shape of a pocket and provided at one side thereof with an opening, and the opening of the drug pack is sealed, thereby making make a drug package. In this case, the drug package is formed by linking a plurality of drug packs with each other. In detail, the drug package is formed by automatically packing the dose of drugs and consecutively linking the drug packs with each other. Accordingly, the drug package becomes the stack of plural drug packs consecutively linked with each other.

As the drug packages are consecutively linked with each other and a great amount of drugs constitute the stack of drug packs, it is difficult to distinguish a drug package for each patient among the stack of the drug packs.

In addition, the classification of drug packages is not only difficult, but also it is difficult to transfer the stack of consecutively-linked drug packs to a related patient or it is difficult for the patient to bring or store the stack of the drug packs after the drug packages have been classified.

DISCLOSURE

Technical Problem

Accordingly, the present invention has been made keeping in mind the above problems occurring in the prior art, and an object of the present invention is to wind and cut a drug package and attach a sticker to an end portion of the cut drug package.

In addition, another object of the present invention is to transfer a drug package to a drug package winding unit to wind the drug package after stably introducing the drug package into a body.

In addition, still another object of the present invention is to wind a drug package for each patient by recognizing the information of the drug package.

Further, still yet another object of the present invention is to wind a drug package by rotating a drug bobbin part, which winds the drug package, after drawing the drug bobbin part forward.

In addition, still yet another object of the present invention is to allow a drug bobbin part, which winds the drug package, to move backward and forward.

In addition, still yet another object of the present invention is to wind a drug package around an outer portion of a drug bobbin part after moving up one of two winding members constituting the drug bobbin part of the drug package and inserting the drug package into the space between the two winding members.

Further, still yet another object of the present invention is to insert a drug package between two winding members without additional equipment.

In addition, still yet another object of the present invention is to guide a drug bobbin part according to the winding procedure of a drug package so that the drug bobbin part is drawn forward or introduced backward.

In particular, still yet another object of the present invention is to move a drug bobbin part forward or backward, moving one of winding members of the drug bobbin part up, and detecting the rotation position of the drug bobbin part.

In addition, still yet another object of the present invention is to guide the winding of a drug package suitably to the thickness of the wound drug package.

Further, still yet another object of the present invention is to adjust the winding speed of a drug package corresponding to an outer diameter of the drug package varied depending on the thickness of the wound drug package.

In addition, still yet another object of the present invention is to ensure a winding space of a drug package according to the thickness of the wound drug package.

In addition, still yet another object of the present invention is to cut one end of a drug package.

Further, still yet another object of the present invention is to guide the moving position of a cutting part to cut a drug package.

Further, still yet another object of the present invention is to allow a cuter to cut one end portion of a drug package while rotating.

In addition, still yet another object of the present invention is to constantly draw a cutter to a predetermined position to cut a drug package.

In addition, still yet another object of the present invention is to prevent a drug package from being out of the position thereof when a cutter is drawn.

Further, still yet another object of the present invention is to cover an upper portion of a cutting part to cut a drug package while rotating.

Further, still yet another object of the present invention is to detect the position of a drug package to be cut.

In addition, still yet another object of the present invention is to fix a cut end portion of a drug package while winding the drug package.

In addition, still yet another object of the present invention is to separate a sticker from a release paper and then attach the sticker to the cut end portion of the drug package.

Further, still yet another object of the present invention is to firmly attach a sticker to an end portion of a drug package by pressing the sticker when the sticker is attached to the end portion of the drug package.

Further, still yet another object of the present invention is to discharge a wound drug package in the state that the end portion of the wound drug package is fixed.

In addition, still yet another object of the present invention is to discharge a wound drug package roll by distinguishing between one side and an opposite side of a body.

In addition, still yet another object of the present invention is to not only discharge a wound drug package roll to an outside of a body, but also discharge a drug package in the state that the drug package is not wound.

Further, still yet another object of the present invention is to discharge wound drug package rolls by distinguishing between a wound drug package roll matched with previously-input information and a wound drug package roll mismatched with the previously-input information.

Technical Solution

In order to accomplish the above objects of the present invention, there is provided a drug package winding apparatus. The drug package winding apparatus includes a drug package introducing unit to introduce a drug package, which is formed by packaging a great amount of drugs in a unit of a single pack having a dose of drugs and is not individually divided into single packs, into a body, a drug package winding unit to wind the drug package introduced into the drug package introducing unit, a drug package cutting unit to cut a boundary between one side pack and an opposite side pack of the drug package wound by the drug package winding unit, a sticker attaching unit to attach a sticker to an end portion of the drug package cut by the drug package cutting unit, and a drug package discharge unit to discharge the drug package having the sticker by the sticker attaching unit.

The drug package introducing unit comprises an introduction plate extending from one side of the body to the drug package winding unit to link the one side of the body with the drug package winding unit, and introducing and withdrawing rollers installed at both sides of the introduction plate, respectively.

Each of the introducing and withdrawing rollers includes upper and lower rollers installed above and under the introduction plate. The upper and lower rollers are perpendicular to each other. The introduction plate is formed therein with an introduction hole and a withdrawal hole such that the upper roller makes contact with the lower roller.

The drug package introducing unit further includes a barcode reader to recognize information of the drug package introduced onto the introduction plate between the introduction hole and the withdrawal hole of the introduction plate.

The drug package winding unit includes a drug bobbin part installed at one side of the drug package introducing unit, one side of the drug package being inserted into the drug bobbin part such that the drug package is wound around an outer surface of the drug bobbin part, a bobbin rotating part to rotate the drug bobbin part, and a bobbin backward and forward movement part to move the drug bobbin part forward or backward.

The bobbin backward and forward movement part includes a backward and forward seating plate on which the drug bobbin part is seated, a backward and forward movement guide rail coupled with the backward and forward seating plate to guide movement of the backward and forward seating plate, a backward and forward movement pulley unit to rotate the backward and forward movement guide rail, and a backward and forward driving unit to drive the backward and forward movement pulley unit.

The drug bobbin part includes a bobbin housing provided therein with one sides of two winding members that are arranged up and down, a leaf-spring member installed at a lower winding member located lower than an upper winding member of the two winding members, which is installed rotatably upward, to return the upper winding member such that the upper winding member is rotated, or to press the upper winding member such that the upper winding member is parallel to the lower winding member, and a winding hole member formed therein a winding hole to press the upper winding member such that the upper winding member, which is drawn to a front portion of the body, is parallel to the lower winding member when the drug bobbin part is moved to the front portion of the body.

A space between the upper and lower winding members maintains a level with respect to the introduction plate.

The drug package winding apparatus further includes a bobbin position sensor provided at one side of the backward and forward movement guide rail to guide a moving position of the drug bobbin part.

Bobbin position sensors are installed at an insertion position, where the one side of the drug package is inserted between the upper and lower winding members as the drug bobbin part is provided at the front portion of the body and the upper winding member is moved up, a winding position where the drug package is wound around outer portions of the upper and lower winding members as the drug bobbin part is moved to a rear portion of the body by a predetermined interval and the upper and lower winding members are parallel to each other, and a separation position where a wound drug package roll is separated from the upper and lower winding members of the drug bobbin part as the drug bobbin part is moved to the rear portion of the body.

The drug package winding apparatus further includes a winding guide member provided at one side of the drug bobbin part and having a winding guide roller provided at an end portion thereof to guide winding of the drug package inserted between upper and lower winding members and wound around the upper and lower winding members, such that the winding guide member is moved up according to a thickness of the wound drug package.

The drug bobbin part includes a bobbin left and right movement part allowing the drug bobbin part to move left or right to maintain a predetermined distance from the drug package introducing unit as a thickness of the drug package wound around upper and lower winding members is increased.

The bobbin left and right movement part includes a left and right movement seating plate on which the drug bobbin part is seated, a left and right movement guide rail coupled with the left and right movement seating plate to guide movement of the left and right movement seating plate, a left and right movement pulley unit to rotate the left and right movement guide rail, and a left and right movement driving unit to drive the left and right movement pulley unit.

The drug package cutting unit includes a cutter part to divide one-side pack and an opposite-side pack of the drug package from each other, a cutting movement member provided at a front portion thereof with the cutter part such that the cutting movement member is drawn from an inner part of the body to a front portion of the body, a cutting movement guide rail having the cutting movement member seated thereon to guide movement of the cutting movement member, a cutting movement pulley part to fix an opposite side of the cutting movement member thereto such that the cutting movement member is moved forward and backward, and a cutting driving pulley part driven by a cutting driving unit such that the cutting driving pulley part is coupled with the cutting movement pulley part to drive the cutting movement pulley part.

The drug package winding apparatus includes a cutting position guiding sensor and a return position guiding sensor provided at an inside and a front side of the cutting movement guide rail, respectively, to guide a moving position of the cutting movement member.

The cutter part includes a circle cutter, cutter support members having diameters smaller than a diameter of the circle cutter and making contact with both lateral sides of the circle cutter to support rotation of the circle cutter, a cutter rotating shaft passing through center parts of the circle cutter and the cutter support member such that the circle cutter is rotatable, and a cutter fixing member provided at a front portion thereof with a rotation support member to support both ends of the cutter rotating shaft, and fixed to a front portion of the cutting movement member at a rear portion.

The cutter part includes a cutting guide part provided at a front portion of the body to guide drawing of the circle cutter to a predetermined position when the circle cutter is drawn to the front portion of the body.

The cutting guide part includes an incised groove such that the circle cutter is inserted into the incised groove when the cutter part is drawn to the front portion of the body, and a cutting guide member having an inclined surface lowered toward the front portion of the body such that the circle cutter is inserted into the incised groove.

The cutting guide part includes a cutter pressing member to press the circle cutter such that the circle cutter is inserted into the incised groove.

The cutter part further includes a cutting fixing part to fix a position of the drug package such that the drug package is prevented from being out of the position thereof due to an operation of the cutter part when the cutter part cuts the drug package.

The cutting fixing part includes at least two position fixing members to fix both sides of the drug package to be cut, a fixing member rotating shaft to rotate the position fixing members, and a fixing member driving unit to rotate the fixing member rotating shaft.

The cutter part includes a cutter cover member spaced apart from a circle cutter to cover an upper portion of the circle cutter and fixed to a rotation support member.

The drug package cutting unit further includes a bonding part detecting sensor to detect a bonding part of the drug package, which is formed by folding two wrapping papers, such that the cutter part cuts the bonding part of the drug package.

The sticker attaching unit includes a wound sticker roll installing part installed in a sticker attaching unit installing part and above the drug package cutting unit to unwind a wound sticker roll formed by winding a release paper to which stickers having a predetermined size are consecutively attached, a plurality of guiding rollers to guide unwinding of the release paper having the stickers attached thereto from the wound sticker roll in the wound sticker roll installing part, a separation guiding part allowing the stickers to be separated from the release paper, and a wound release paper roll installing part to wind the release paper.

The separation guiding part is located at an upper portion of the drug package cutting unit, and inclined such that one side of the separation guide part is located at an upper portion of the drug package while being located under the guide roller to be closer to the upper portion of the drug package than an opposite side of the separation guide part.

The sticker attaching unit includes an up and down movement part for a sticker attaching operation to move the sticker attaching unit installing part up and down.

The up and down movement part for the sticker attaching operation includes a sticker attaching unit up and down movement member coupled with the sticker attaching unit installing part to move the sticker attaching unit installing part up and down, a sticker attaching unit guide member inserted into the sticker attaching unit up and down movement member to move the sticker attaching unit up and down movement member up and down, and a sticker attaching unit driving unit to drive the sticker attaching unit guide member to move the sticker attaching unit up and down movement member up and down.

The sticker attaching unit further includes an attaching roller installed at a lower end of the separation guiding part to press a top surface of the sticker such that the sticker separated from the release paper by the separation guide part is attached.

The body includes a drug package discharge unit to discharge the drug package to which the sticker is attached by the sticker attaching unit.

The drug package discharge unit includes a discharge conveyer belt, on which a wound drug package roll wound by the drug package winding unit and having the sticker attached thereto by the sticker attaching unit, is seated, a driving direction of the discharge conveyer belt being changed to one side or an opposite side such that the wound drug package roll is discharged to a lower side of the body or an outside of the body, a discharge backward and forward movement part to move the discharge conveyer belt backward and forward, and a discharge up and down movement part to move the discharge backward and forward movement part up and down.

The drug package winding apparatus further includes a discharge hopper provided under the discharge conveyer belt to discharge the wound drug package roll discharged through the discharge conveyer belt, a discharge guide member rotatably provided under the discharge hopper to guide a discharge direction of the wound drug package roll, a correctively-wound drug package roll box provided under the one side of the discharge conveyer belt to receive a correctively-wound drug package roll discharged when information recognized by a barcode reader is matched with previously input information, and an erroneously-wound drug package roll box provided under the opposite side of the discharge conveyer belt to receive an erroneously-wound drug package roll discharged when the information recognized by the barcode reader is mismatched with the previously input information.

BEST MODE

Mode for Invention

Hereinafter, the structure and the operation of a drug package winding apparatus according to an exemplary embodiment of the present invention will be described in detail with reference to accompanying drawings.

Figure 1:
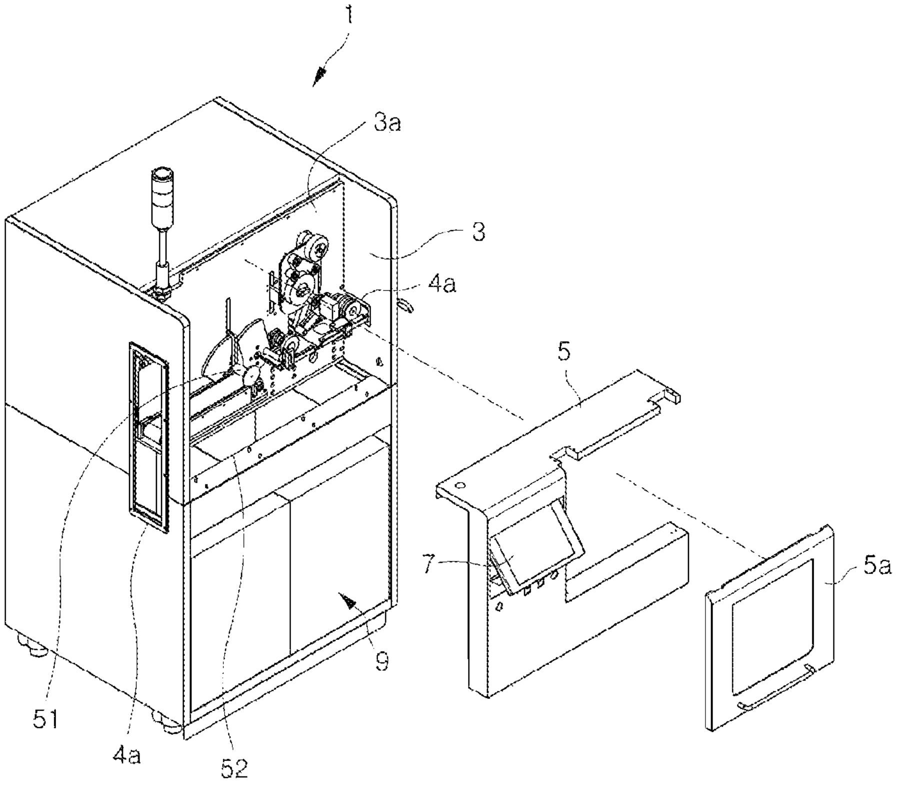
FIG. 1 is an exploded perspective view showing a drug package winding apparatus having an open front surface according to the present invention.
Figure 2A:
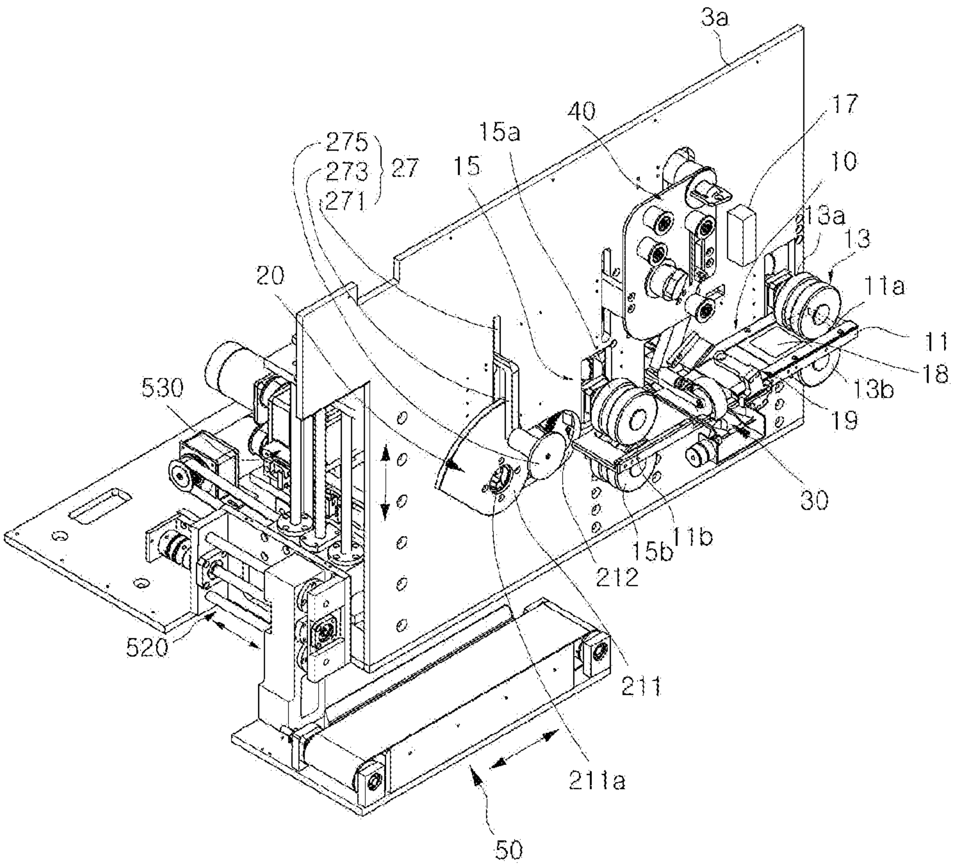
FIGS. 2*a* and 2*b* are views showing the front surface of the drug package winding apparatus according to the present invention
Figure 2B:
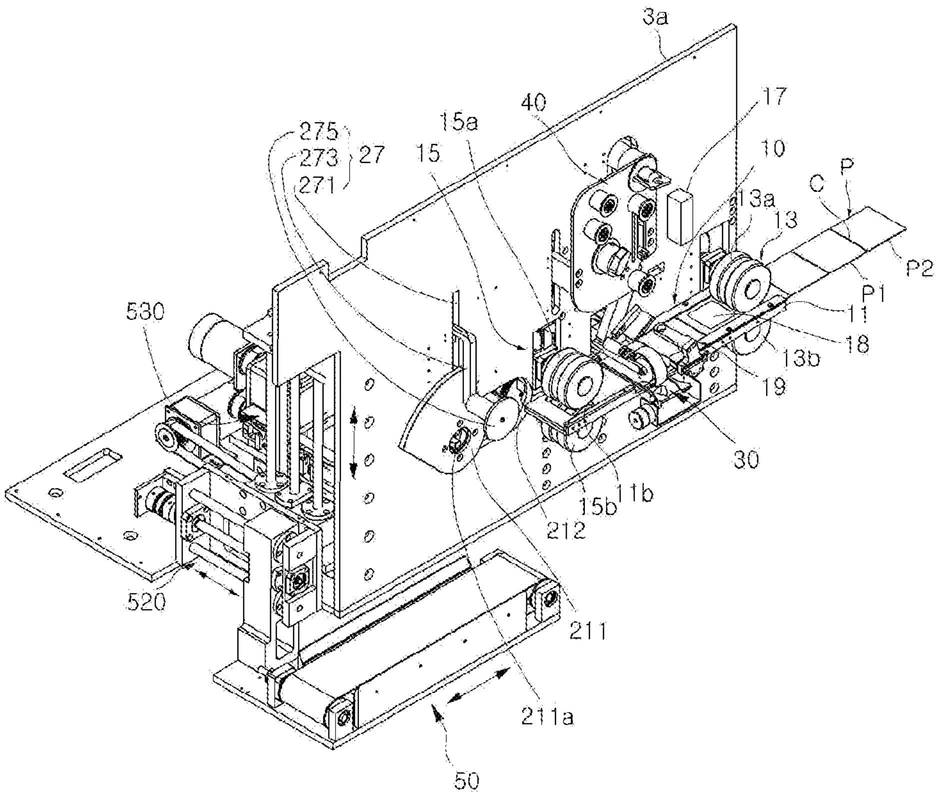

FIG. 1 is an exploded perspective view showing a drug package winding apparatus having an open front surface according to the present invention, and FIGS. 2*a* and 2*b* are views showing the front surface of the drug package winding apparatus according to the present invention. FIGS. 3*a*, 3*b*, 3*c*, and 3*d* are views showing the operation of a drug package winding unit of the drug package winding apparatus according to the present invention.

As shown in drawings, a drug package winding apparatus 1 according to the embodiment of the present invention winds and cuts a drug package P, which is formed by consecutively packaging a dose of drugs received at a predetermined interval using front and back wrapping papers having a long length, according to patients, and makes a bundle of the drug package to be distributed to each patient. The drug package winding apparatus 1 includes a body 3, a cover part 5 to cover the front surface of the body 3, and a manipulating part 7 installed in the front surface of the cover part 5 to manipulate the drug package winding apparatus 1.

The body 3 is divided into a front portion and a rear portion by a separator 3*a*. The body 3 is provided at one side thereof with an inlet port 4*a* to input the drug package P therein and provided at an opposite side thereof with an outlet port 4*b* to output the drug package P. The body 3 is provided in a lower portion thereof with a discharge space 9 to discharge a drug package winding roll R formed by winding and binding the drug package P.

In addition, the cover part 5 is provided in one side thereof with a cover door 5*a* allowing a worker to open some parts constituting the drug package winding apparatus 1 to be described later and perform a maintenance work for the parts.

As shown in FIG. 2*a*, the body 3 includes a drug package introduction unit 10 to introduce the drug package P in the body 3, a drug package winding unit 20 to wind the drug package P, which is introduced into the drug package introduction unit 10, therearound, a drug package cutting unit 30 to cut the boundary between one side drug pack P1 and an opposite side drug pack P2 of the drug package P, which are wound around the drug package winding unit 20, a sticker attaching unit 40 to attach a sticker S to an end portion of the drug package P cut by the drug package cutting unit 30, and a drug package discharge unit 50 to discharge the drug package P having a sticker S attached thereto by the sticker attaching unit 40.

The drug package introduction unit 10 is provided at one side of the separator 3*a* of the body 3 to introduce the drug package P, which is wound around the drug package winding unit 20 to be described later. The drug package P introduced through the inlet port 4*a*, which is provided at one side of the body 3 to introduce the drug package P, is seated on the drug package introduction unit 10. The drug package introduction unit 10 includes an introduction plate 11, which extends from the inlet port 4*a* to the drug package winding unit 20 to be described later to link the inlet port 4*a* with the drug package winding unit 20, and introducing and withdrawing rollers 13 and 15 provided at opposite sides of the introduction plate 11.

In this case, the introduction plate 11 has an introduction hole 11*a* communicating the top and the bottom at one side, that is, at a side adjacent to the inlet port 4*a*, and a withdrawal hole 11*b* provided at an opposite side of the introduction plate 11, that is, at a side adjacent to the drug package winding unit 20.

In addition, the introducing roller 13 and the withdrawing roller 15 including upper and lower introducing rollers 13*a* and 13*b*, and upper and lower withdrawing rollers 15*a* and 15*b*, respectively, are arranged up and down.

In this case, the upper introducing roller 13*a* and the lower introducing roller 13*b* are arranged above and under the introduction hole 11*a*, so that the upper introducing roller 13*a* makes contact with the lower introducing roller 13*b*.

In addition, naturally, the upper and lower withdrawing rollers 15*a* and 15*b* are arranged above and under the withdrawal hole 11*b* so that the upper withdrawing roller 15*a* makes contact with the withdrawing roller 15*b*.

Introduction and withdrawal up and down movement units (not shown) are installed in the introducing roller 13 and the withdrawing roller 15 so that the introducing roller 13 and the withdrawing roller 15 are individually moved up or moved down. Accordingly, when the drug package P is introduced onto the introduction plate 11, the upper introducing and withdrawing rollers 13*a* and 15*a* are moved up. After the drug package P has been introduced onto the introduction plate 11, the upper introducing and withdrawing rollers 13*a* and 15*a* are moved down so that the upper introducing and withdrawing rollers 13*a* and 15*a* make contact with the top surface of the drug package P and transfer the drug package P from the inlet port 4*a* to the outlet port 4*b*.

Meanwhile, referring to FIG. 2*b*, a barcode reader 17 is installed in the drug package introduction unit 10 to recognize the information of the drug package P introduced onto the introduction plate 11 between the introduction hole 11*a* and the withdrawal hole 11*b*.

The barcode reader 17 is generally known to those skilled in the art, and recognizes the information of the drug package P through a bar code printed in the drug package P by using the intensity of light irradiated from the backlight 18 mounted on the bottom surface of the introduction plate 11.

As the barcode reader 17 reads the information of a patient through a barcode printed in the drug package P introduced onto the introduction plate 11 through the inlet port 4*a* of the body 3, the drug package cutting unit 30 can cut the drug package P according to patients.

In addition, a bonding part detecting sensor 19 is provided at one side of a backlight 18 of the barcode reader 17 on the introduction plate 11. The bonding part detecting sensor 19 detects the position of the drug package P to be cut by using an ultrasonic wave. In other words, the bonding part detecting sensor 19 detects the position where two sheets of wrapping papers constituting the drug package P are folded when drugs are inserted into the drug package P.

A pocket is formed to receive drugs so that drugs are inserted into the space between the wrapping papers of the drug package P. If the drugs are received into the wrapping papers, a bonding part is formed between the wrapping papers to bond the wrapping papers to each other so that the wrapping papers are sealed. Since the drug package cutting unit 40 to be described later cuts the bonding part to divide the drug package P, the bonding part detecting sensor 19 detects the above bonding part instead of the pocket of the overlapped wrapping papers having an open portion therebetween to cut the exact position of the drug package p, thereby preventing the drugs received in the drug package P from being exposed.

Figure 3A:
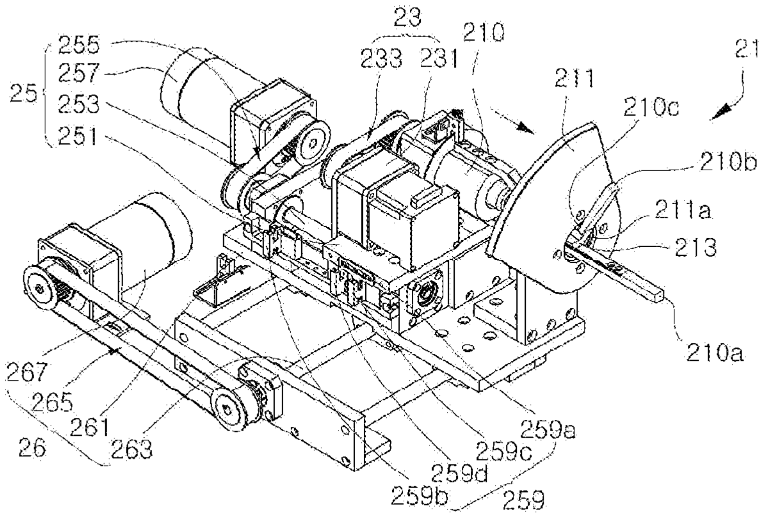
FIGS. 3*a*, 3*b*, 3*c*, and 3*d* are views showing the operation of a drug package winding unit of the drug package winding apparatus according to the present invention.

As shown in FIG. 3*a*, the drug package winding unit 20 winds the drug package P, which is introduced through the drug package introduction unit 10, therearound. The drug package winding unit 20 is located at the side of the end portion of the above-described drug package introducing unit 10. The drug package winding unit 20 includes a drug bobbin part 21 including two winding members 210*a* and 210*b* arranged in such a manner that one end of the drug package P is inserted between the two winding members 210*a* and 210*b*, a bobbin rotating part 23 to rotate the drug bobbin part 21, a bobbin backward and forward movement part 25 to move the drug bobbin part 21 to a front portion or a rear portion of the body 3, and a bobbin left and right movement part 26.

The drug bobbin part 21 winds the drug package P around the outer portions of the first and second winding members 210*a* and 210*b* arranged at the upper and lower portions thereof. The first and second winding members 210*a* and 210*b* are arranged perpendicularly to each other in a bobbin housing 210, so that an end portion of the drug package P introduced through the drug package introducing unit 10 is inserted between the first and second winding members 210*a* and 210*b*, and the bobbin housing 210 is rotated, thereby winding the drug package P around the outer portions of the first and second winding members 210*a* and 210*b*.

In addition, the drug bobbin part 21 includes a winding hole member 211 installed at the front side of the separator 3*a* of the body 3 and having a winding hole 211*a* therein. The winding hole member 211 protrudes from the front portion of the separator 3*a*. The separator 3*a* is formed therein with a winding movement hole 212 formed longitudinally leftward or rightward so that the winding hole member 211 is movable leftward or rightward.

In this case, a leaf-spring member 213 serving as an elastic member is provided at the first winding member 210*a* located lower than the second winding member 210*b* in the bobbin housing 210 in such a manner than the leaf-spring member 213 is perpendicular to the first winding member 210*a*. The second winding member 210*b* located at the upper portion is divided into two members in such a manner that a rotatable hinge 210*c* is installed to rotate the second winding member 210*b* upward.

Accordingly, if the first and second winding members 210*a* and 210*b* are drawn toward the front of the body 3 through the winding hole 211*a* of the winding hole member 211, after the leaf-spring member 213 installed perpendicularly to the first winding member 210*a* located at the lower portion is folded, the leaf-spring member 213 is returned perpendicularly to the first winding member 210*a* while pressing the second winding member 210*b*, so that the second winding member 210*b* is moved up by the rotational hinge 210*c*, so the drug package P is inserted between the first and second winding members 210*a* and 210*b*.

Figure 3B:
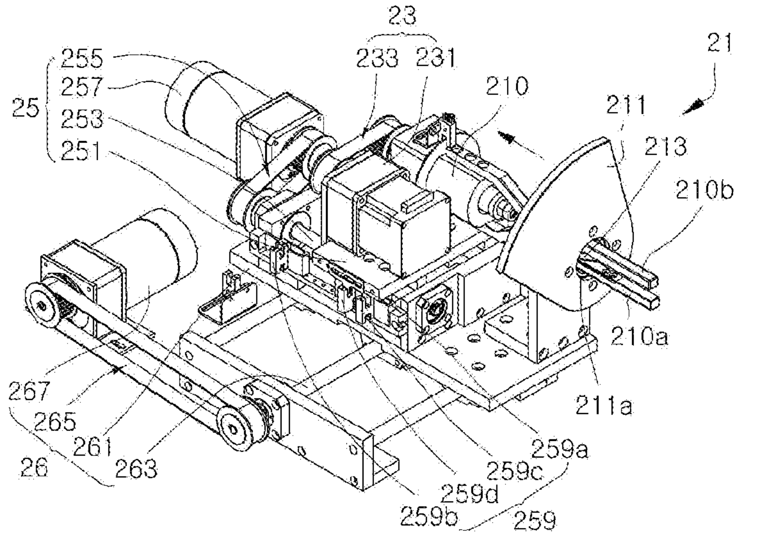
Figure 3C:
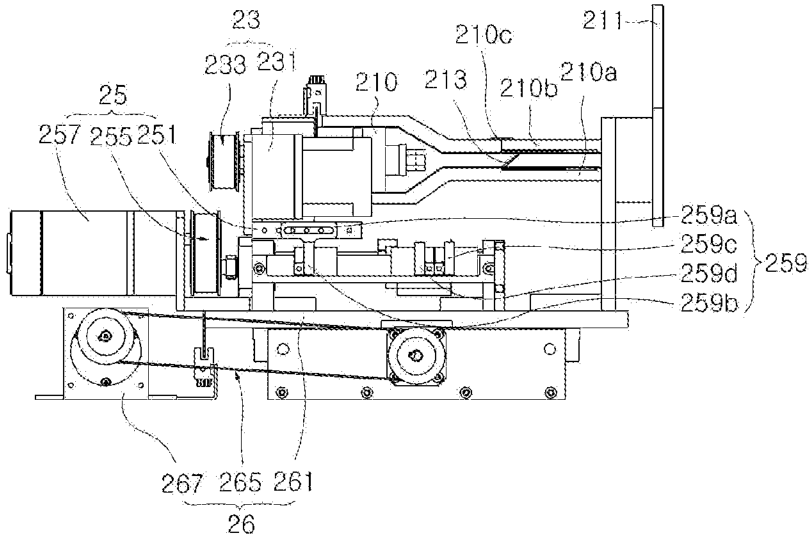

Thereafter, if one side of the drug package P is inserted between the first and second winding members 210*a* and 210*b*, the bobbin backward and forward movement part 25 to be described later is moved to the rear portion of the body 3 as shown in FIGS. 3*b* and 3*c* by a predetermined interval while allowing the winding hole 211*a* to press the moved-up second winding member 210*b* so that the first and second winding members 210*a* and 210*b* are vertically arranged to be parallel to each other.

The bobbin rotating part 23 rotates the above drug bobbin part 21 so that the drug package P is wound around the bobbin rotating part 23. The bobbin rotating part 23 rotates the drug bobbin part 21 by a bobbin rotation driving unit 231 installed at one side of the bobbin housing 210 and a rotation belt pulley part 233 to link the bobbin rotation driving unit 231 to the bobbin housing 210. Accordingly, the drug package P is wound around the outer portions of the first and second winding members 210*a* and 210*b* vertically arranged while being parallel to each other.

The bobbin backward and forward movement part 25 includes a backward and forward seating plate 251 on which the drug bobbin part 21 is seated, a backward and forward movement guide rail 253 coupled with the backward and forward seating plate 251 to move the backward and forward seating plate 251 backward or forward, a backward and forward driving unit 257 to rotate the backward and forward movement guide rail 253, and a backward and forward movement pulley unit 255 to link the backward and forward movement guide rail 253 with the backward and forward driving unit 257.

The bobbin left and right movement part 26 includes a left and right movement guide rail 263 to move backward or forward a left and right movement seating plate 261, on which the backward and forward movement guide rail 253 having the backward and forward seating plate 251 seated therein is seated, and a left and right movement pulley unit 265 to link a left and right movement driving unit 267, which drives the left and right movement guide rail 263, with the left and right movement guide rail 263 and the left and right movement driving unit 267.

In this case, the above winding hole member 211 is attached to the front portion of the left and right movement seating plate 261, so that the winding hole member 211 moves together with the left and right movement seating plate 261 when the left and right movement seating plate 261 moves left or right.

Accordingly, if the backward and forward driving unit 257 is driven, the backward and forward seating plate 251, which is fixed to the backward and forward movement guide rail 253, moves left or right by the backward and forward movement pulley unit 255 according to the driving direction of the backward and forward driving unit 257. Simultaneously, the drug bobbin part 21 seated on the backward and forward seating plate 251 moves to the front portion of the body 3 or the rear portion of the body 3.

If the left and right movement driving unit 267 is driven, the drug bobbin part 21 and the backward and forward seating plate 251 seated on the left and right movement seating plate 261 fixed to the left and right movement guide rail 263 by the left and right movement pulley unit 265 according to the driving direction of the left and right movement driving unit 267.

In this case, a bobbin position sensor 259 is additionally provided on the bobbin backward and forward movement part 25 to guide a position in which the drug bobbin part 21 moves forth or moves back.

The bobbin position sensor 259 serves as a photocoupler having light emitting and receiving parts. The bobbin position sensor 259 is fixed at one side of the backward and forward seating plate 251 so that a position sensing member 259*a* stops the movement of the backward and forward seating plate 251 when the light emitted from the light emitting part of the bobbin position sensor 259 is not received in the light receiving part due to the movement of the backward and forward seating plate 251.

In this case, preferably, bobbin position sensors 259 are installed at a rear-portion bobbin position 259*b* in which the drug bobbin part 21 is located at the rear portion of the body 3, a drug package introducing position 259*c* in which the first and second winding members 210*a* and 210*b* of the drug bobbin part 21 completely move forward from the winding hole 211 and the second winding member 210*b* rotates by the rotatable hinge 210*c* so that the second winding member 210*b* is moved up, and a drug package winding position 259*b* in which, if one end of the drug package P is inserted between the first and second winding members 210*a* and 210*b*, the rotated second winding member 210*b* is pressed by the winding hole 211*a* so that the first and second winding members 21*a* and 210*b* are parallel to each other, so the drug package P is wound around the outer portions of the first and second winding members 210*a* and 210*b*.

Referring to FIG. 2*a* again, a winding guiding part 27 is additionally installed above the drug bobbin part 21 to guide the winding of the drug package P around the outer portions of the first and second winding members 210*a* and 210*b* arranged in parallel to each other.

The winding guiding part 27 includes a winding guide hole 271 vertically formed with a long length in the separator 3*a* above the winding movement hole 212 described above, a winding guide member 273 protruding from the rear portion of the separator 3*a* to the front portion of the separator 3*a* through the winding guide hole 271 so that the winding guide member 273 is moved up and down along the winding guide hole 271, and a winding guide roller 275 installed at the end portion of the winding guide member 273 to guide the roundly-winding of the drug package P around the drug bobbin part 21.

Figure 3D:
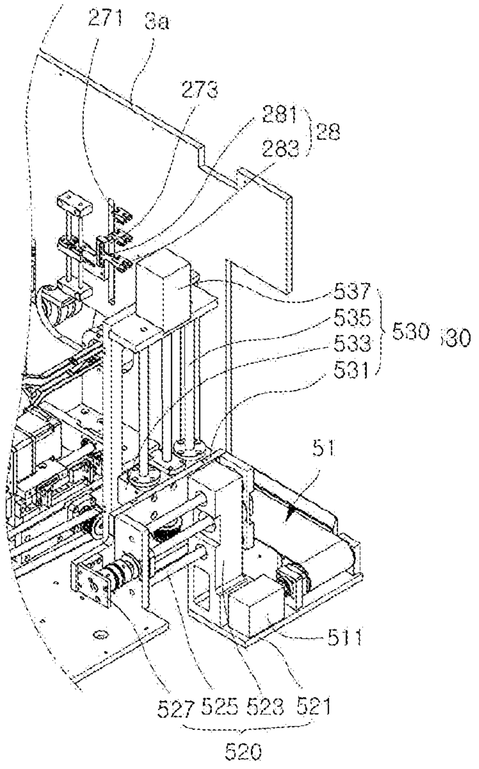

In this case, as shown in FIG. 3*d*, a winding speed sensor 28 is additionally installed in the winding guiding part 27 to detect the moving-up of the winding guide member 273.

The winding speed sensor 28 is provided at the rear side of the body 3, that is, at the side of the rear surface of the separator 3*a* while serving as a generally-known photocoupler similarly to other sensors. The winding speed sensor 28 includes a winding position sensing member 281 provided at one side of the winding guide member 273 located at the side of the rear surface of the separator 3*a*, and tensile force adjustment position members 283 installed at a plurality of positions of the rear surface of the separator 3*a* so that the winding position sensing member 281 is inserted between the light emitting and receiving parts.

The winding speed sensor 28 having the above structure detects the position of the winding guide member 273 as the winding position sensing member 281 is inserted into the tensile force adjustment position member 283, when the winding guide member 273 having the winding guide roller 275 making contact with the outer surface of the wound drug package roll R is moved up along the winding guide hole 271 as the volume of the drug package P wound around the drug bobbin part 21 of the winding guide member 273 is increased so that the thickness of the wound drug package roll R is gradually increased.

In detail, the winding speed sensor 28 can detect the thickness of the wound drug package roll R depending on the positions of the winding guide member 273 to adjust the rotational speed of the drug bobbin part 21 around which the drug package P is wound.

If the thickness of the wound drug package roll R is increased, the circumference of the wound drug package roll R is gradually increased. Accordingly, when the drug bobbin part 21 rotates once, the wound length of the drug package P is increased. If the winding speed of the drug bobbin part 21 is constant, the tensile force of the drug package P introduced through the introduction plate 11 is excessively greatly represented, so that the drug package P may be snapped and damaged. Accordingly, the winding speed sensor 28 is required to decrease the winding speed of the drug package P depending on the thickness of the wound drug package roll R.

Accordingly, even if an amount of the drug package P wound around the drug bobbin part 21 is increased, so that the thickness of the wound drug package P is increased, the winding guide roller 275 makes contact with the drug package P while rotating, and the winding guide member 273 is moved up along the winding guide hole 271 as the thickness of the wound drug package P is increased, so that the drug package P can be stably wound.

In this case, if the thickness of drug package P wound around the outer portions of the first and second winding members 210*a* and 210*b* is increased, the drug bobbin part 21 moves left or right depending on the thickness of the wound drug package roll R while receiving the guidance of the winding guide roller 275 of the winding guiding part 27. In addition, since the winding hole member 211 is fixed onto the left and right movement seating plate 261, the winding hole member 211 moves together with the drug bobbin part 21.

Figure 4A:
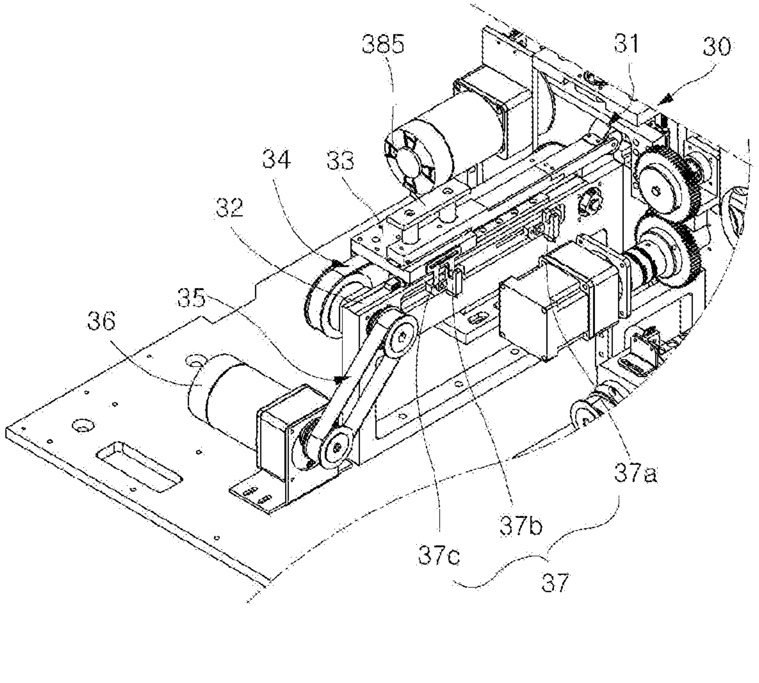
FIGS. 4*a*, 4*b*, 4*c*, and 4*d* are views showing a drug package cutting unit of the drug package winding apparatus according to the present invention.
Figure 4B:
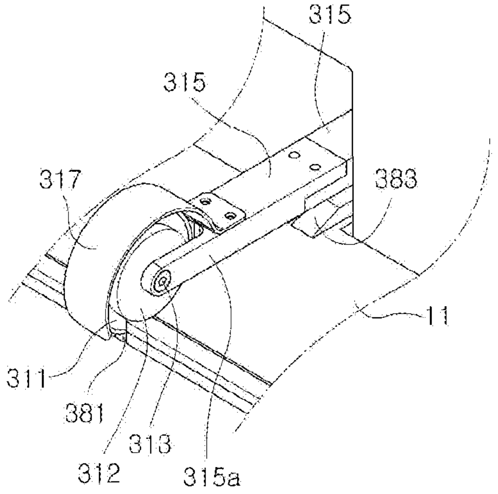
Figure 4C:
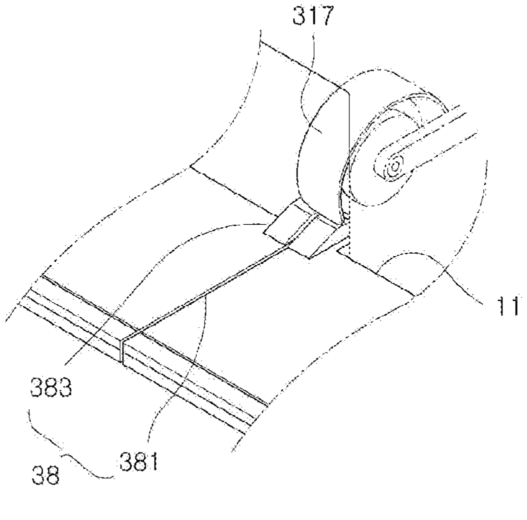
Figure 4D:
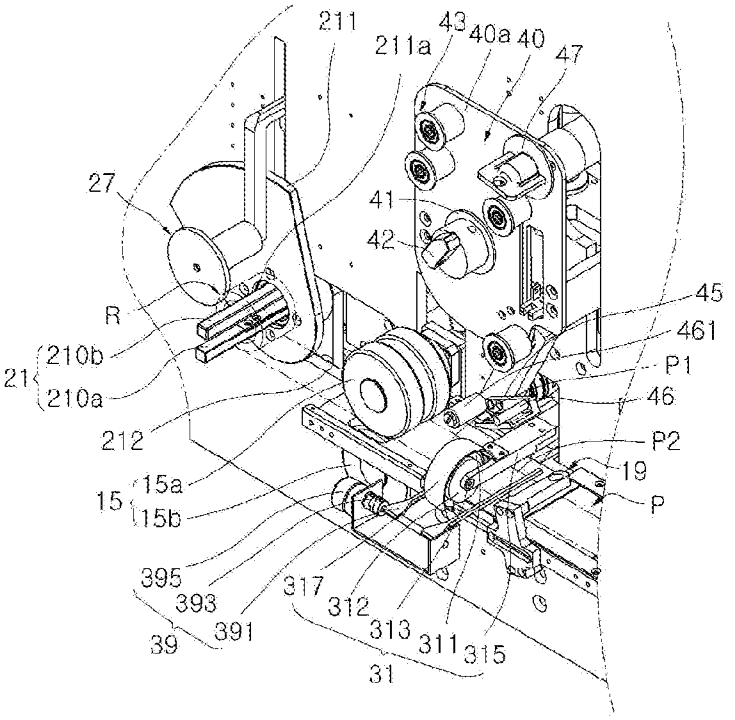
Figure 5A:
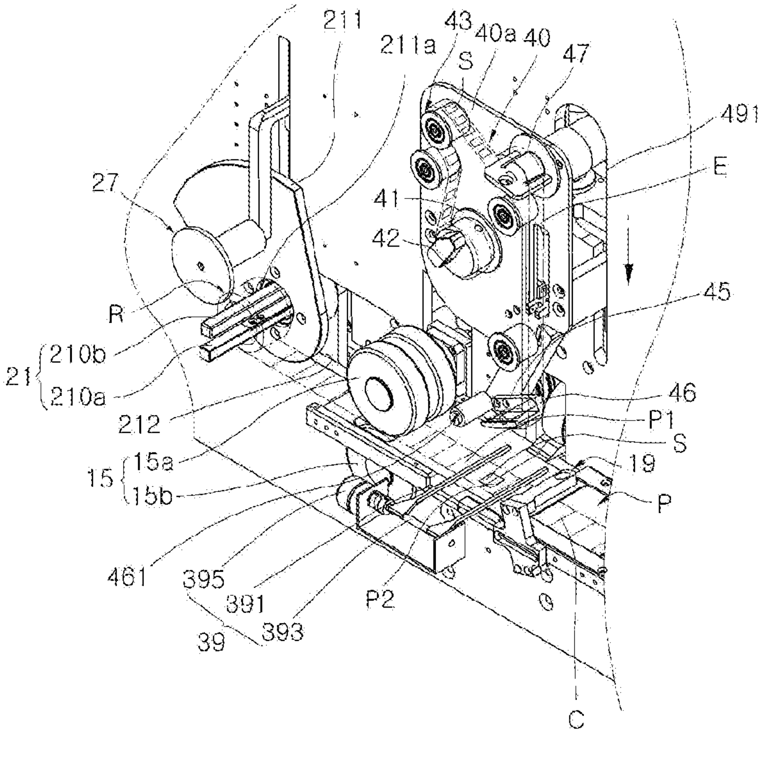
FIGS. 5*a* and 5*b* are views showing a sticker attaching unit of the drug package winding apparatus according to the present invention.
Figure 5B:
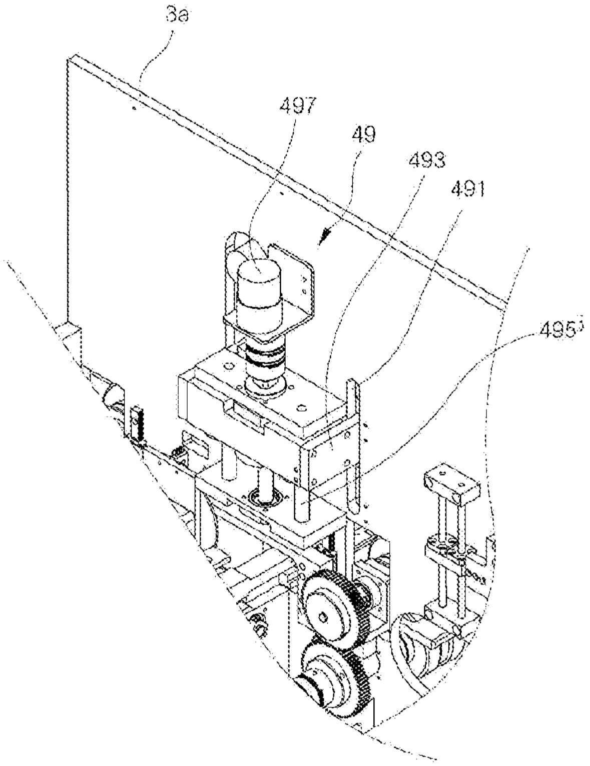
Figure 6A:
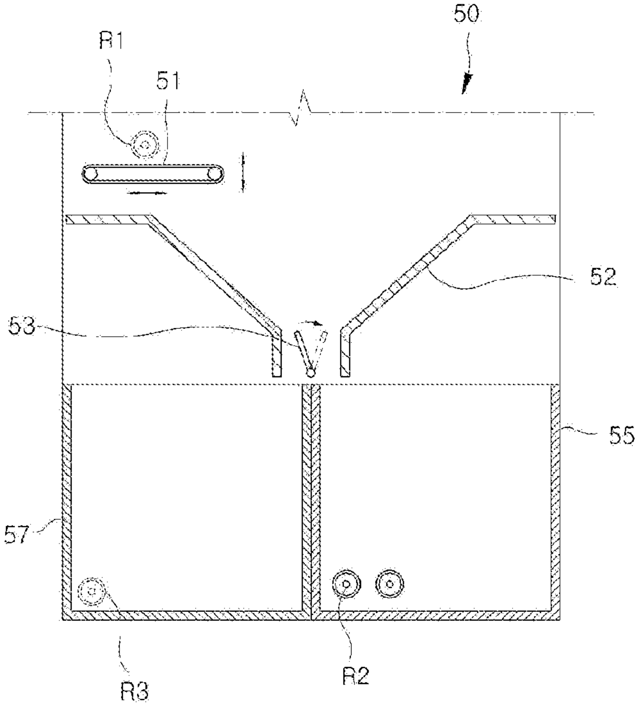
FIGS. 6*a* and 6*b* are views showing the drug package discharge unit of the drug package winding apparatus according to the present invention.
Figure 6B:
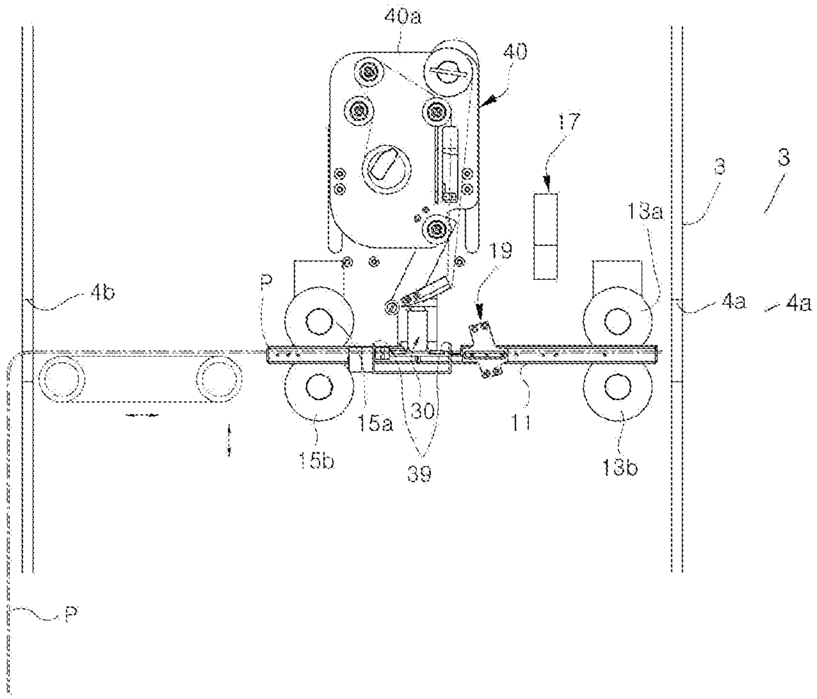

FIGS. 4*a*, 4*b*, 4*c*, and 4*d* are views showing the drug package cutting unit of the drug package winding apparatus according to the present invention, and FIGS. 5*a* and 5*b* are views showing the sticker attaching unit of the drug package winding apparatus according to the present invention. FIGS. 6*a* and 6*b* are views showing the drug package discharge unit of the drug package winding apparatus according to the present invention.

As shown in drawings, the drug package cutting unit 30 cuts the drug package P according to the information of the patient of the drug package P obtained through the barcode reader 17. The drug package cutting unit 30 includes a cutter part 31 to divide one-side pack P1 and an opposite-side pack P2 of the drug package P from each other, a cutting movement member 33 provided at the front portion thereof with the cutter part 31 so that the cutting movement member 33 is drawn from the rear portion of the body 3 to the front portion of the body 3, a cutting movement guide rail 32 having the cutting movement member 33 seated thereon to guide the movement of the cutting movement member 33, a cutting movement pulley part 34 to which an opposite side of the cutting movement member 33 is fixed, a cutting driving pulley part 35 installed in such a manner that the cutting driving pulley part 35 cooperates with the cutting movement pulley part 34 to drive the cutting movement pulley part 34 and a cutting driving unit 36 to rotate the cutting driving pulley part 35 by driving the cutting driving pulley part 35.

In addition, the drug package cutting unit 30 has a cutting position sensor 37 to sense the position of the cutting movement member 33 having the cutter part 31 installed therein. The cutting position sensor 37 includes a cutting position guiding sensor 37*a* and a restoration position guiding sensor 37*b* provided at the inside and the front side of the cutting movement guide rail 32 serving as a photocoupler, respectively, to guide the moving position of the cutting movement member 33. The cutting movement member 33 includes a cutting sensor member 37*c* to sense the position of the photocoupler by preventing the light emitted from the photocoupler from being received. The cutting sensor member 37*c* passes through the cutting position guiding sensor 37*a* and the restoration position guiding sensor 37*b* to sense the moving position of the cutting movement member 33.

As shown in FIG. 4*b*, the cutter part 31 includes a circle cutter 311 rotating to directly cut the drug package P, cutter support members 312 making contact with both lateral sides of the circle cutter 311 to serve as bearings to guide the rotation of the circle cutter 311, a cutter rotating shaft 313 passing through the center parts of the circle cutter 311 and the cutter support member 312 so that the circle cutter 311 is rotatable, and a cutter fixing member 315 provided at the front portion thereof with a rotation support member 315*a* to support both end portions of the cutter rotating shaft 313, and fixed to the front portion of the cutting movement member 33 at the rear portion.

The cutter part 31 further includes a semicircle cutter cover member 317 spaced apart from the circle cutter 311 and fixed to the cutter fixing member 315 to cover the upper portion of the circle cutter 311, thereby preventing the safety accident to be caused by the circle cutter 311.

In this case, the drug package cutting unit 30 further includes a cutting guide part 38 allowing the cutter part 31 to exactly cut the bonding part C when the cutter part 31 is drawn forward to cut the bonding part C of the drug package P.

As shown in FIG. 4*c*, the cutting guide part 38 may include an incised groove 381 formed in such a manner that the circle cutter 311 is inserted into the incised groove when the circle cutter 311 is drawn to the front portion of the body 3, that is, the introduction plate 11.

In addition, the cutter part 31 is provided at the lower portion thereof with a cutting guide member 383 having an inclined surface lowered toward the front portion of the body 3 so that the circle cutter 311 is moved downward by a predetermined distance while being drawn toward the front portion of the body 3 when the circle cutter 311 provided inside the body 3 is inserted into the incised groove 381 recessed inward from the top surface of the introduction plate 11 in order to cut the bonding part C of the drug package P.

In addition, referring to FIG. 4*a* again, a cutter pressing member 385 is installed to press the cutting movement member 33 so that the cutter part 31 drawn toward the front portion of the body 3 may be inserted into the incised groove 381.

Meanwhile, a cutting fixing part 39 is additionally provided in the drug package cutting unit 30 to fix positions of a drug package P1 and a drug package P located at both sides of the bonding part C of the drug package to be cut so that the drug package P is not out of the position thereof by the cutter part 31 drawn when the cutter part 31 is drawn forward to cut the drug package P.

The cutting fixing part 39 includes position fixing members 391 installed at both drug packages P1 and P2 as described above, a fixing member rotating shaft 393 inserted into the position fixing members allowing the position fixing member 391 to rotate upward, and a fixing member rotating shaft rotating unit 395 to rotate the fixing member rotating shaft 393.

In this case, preferably, the position fixing members 391 are located at both sides of the above incised groove 381.

Accordingly, when the drug package P is wound around the drug bobbin part 21, the position fixing members 391 rotate upward to allow the drug package P to move along the introduction plate 11. When the drug package P must be cut, the position fixing members 391 rotate to make contact with the top surface of the introduction plate 11, thereby fixing the positions of the drug package P.

Accordingly, referring to FIG. 4*d*, if the position of the drug package P is fixed by the cutting fixing part 39, when the cutter part 31 is drawn to the front portion of the body 3 along the cutting movement guide rail 32 in order to cut the drug package P, the circle cutter 311 is drawn along the inclined surface of the cutting guide member 383 and inserted into the incised groove 381, and the cutter pressing member 385 presses the circle cutter 311 to cut the drug package P.

Referring to FIG. 5*a*, if the end portion of the drug package P wound by the drug package winding unit 20 is cut by the drug package cutting unit 30, the sticker attaching unit 40 attaches a sticker S to the end portion of the package P to fix the wound drug package roll R so that the wound drug package roll R is not released. The sticker attaching unit 40 is installed at the upper portion of the above drug package cutting unit 30, so that the sticker attaching unit 40 is moved up or down.

The sticker attaching unit 40 is installed at a sticker attaching unit installing part 40*a* installed at the front portion of the separator 3*a* of the body 3. The sticker attaching unit 40 includes a wound sticker roll installing part 41, to which a wound sticker roll formed by winding a release paper E having stickers S consecutively attached thereto is installed, a plurality of guiding rollers 43 to guide the unwinding of the release paper E having the stickers S attached thereto from the wound sticker roller of the wound sticker roll installing part 41, a separation guiding part 45 to allow the sticker S to be separated from the release paper E, a wound release paper roll installing part 47 to wind the release E without the sticker S, and an up and down movement part 49 for a sticker attaching operation to move up and down the sticker attaching unit installing part 40*a*.

The wound sticker roll installing part 41 is formed in such a manner that a cylindrical wound sticker roll is inserted into the center of the wound sticker roll installing part 41. The wound sticker roll installing part 41 further includes an anti-separation lever 42 to rotate to the front surface of the wound sticker roll installing part 41 if the wound sticker roll is inserted into the wound sticker roll installing part 41 so that the inserted wound sticker roll is not out of the wound sticker roll installing part The guiding rollers 43 guides the movement of the release paper E having the stickers S attached thereto, which is unwound from the wound sticker roll installing part 41, to the separation guiding part 45. The plural guiding rollers 43 are installed in the sticker attaching unit installing part 40*a*. Preferably, the plural guiding rollers 43 are arranged in such a manner that a passage to unwind the release paper E is formed so that the sticker K is smoothly supplied.

The separation guiding part 45 is located at the upper portion of the drug package cutting unit 30, that is, located above the cutter part 31 so that the sticker S is attached to the position of the drug package P cut by the cutter unit 31. The separation guiding part 45 is located under the guiding roller 43 and inclined so that one side of the separation guiding part 45 is closer to the upper portion of the drug package P than an opposite side of the separation guiding part 45. In this case, an introducing roller 46 is additionally installed at the upper portion of the separation guiding part 45.

In detail, the release paper E having the sticker S introduced into the separation guiding part 45 along the guidance of the guiding roller 43 is guided by the introducing roller 46 located at the upper portion of the inclined separation guiding part 45 while being introduced into the introducing roller 46 and the separation guiding part 45, introduced from the lower portion of the separation guiding part 45 to the rear surface of the separation guiding part 45, and moved to the sticker attaching unit installing part 40*a* located above the separation guiding part 45.

In this case, as the separation guiding part 45 is located above the drug package P and inclined, the sticker S is separated from the release paper E having the direction changed at the lower portion of the separation guiding part 45 and seated at the end portion of the drug package P.

Meanwhile, a rotating attaching roller 461 is additionally installed at the lower end portion of the separation guiding part 45.

In this case, referring to FIG. 5*b*, the up and down movement part 49 for the stick attaching operation includes an up and down guiding hole 491 vertically formed at the separator 3*a* of the body 3 with a length corresponding to the distance at which the sticker attaching unit installing part 40*a* moves up and down, a sticker attaching unit up and down movement member 493 coupled with the sticker attaching unit installing part 40*a* through the up and down guiding hole 491 to move up and down, a sticker attaching unit guide member 495 inserted into the sticker attaching unit up and down movement member 493 so that the sticker attaching unit up and down movement member 493 moves up and down, and a sticker attaching unit driving unit 497 to drive the sticker attaching unit guide member 495.

Accordingly, if the drug package P is cut by the drug package cutting unit 30, the release paper E having the sticker S is unwound from the wound sticker roll installing part 41 and the sticker attaching unit driving unit 497 of the up and down movement part 49 is driven, so that the sticker attaching unit installing part 40*a* moves down. The sticker S separated from the release paper E while passing through the separation guiding part 45 is seated on the end portion of the drug package P. When the drug bobbin part 21 is rotated to move the drug package P, the attaching roller 461 rotates while pressing the top surface of the sticker S attached to the drug package P, so that the sticker S is attached to the drug package P.

Referring to FIG. 3*d* again, the drug package discharge unit 50 is located in the discharge space 9 provided at the lower portion of the body 3. The drug package discharge unit 50 includes a discharge conveyer belt 51, on which the drug package roll R, which is wound by the drug package winding unit 20, has an end portion cut by the drug package cutting unit 30, and has the sticker S attached thereto by the sticker attaching unit 40, is seated, a discharge backward and forward movement part 520 to move backward and forward the discharge conveyer belt 51, and a discharge up and down movement part 530 to move up and down the discharge backward and forward movement part 520.

The discharge conveyer belt 51 allows the wound drug package roll R wound around the drug package winding unit 20 to be separated from the drug bobbin part 21 and seated thereon if the drug bobbin part 21 moves to the rear portion of the body 3. The discharge conveyer belt 51 may be driven to one side or an opposite side according to the driving direction of a discharge conveyer belt driving unit 511.

The discharge backward and forward movement part 520 includes a discharge backward and forward plate 521, on which the discharge conveyer belt 51 is seated, a backward and forward movement member 523 coupled with the discharge backward and forward plate 521, a discharge backward and forward movement guide rail 525 inserted into the discharge backward and forward movement member 523 to guide the discharge backward and forward movement member 523 so that the discharge backward and forward movement member 523 moves backward and forward, and a discharge backward and forward driving unit 527 to drive the discharge backward and forward movement guide rail 525.

In addition, the discharge up and down movement part 530 includes a discharge up and down movement plate 531 coupled with the discharge backward and forward movement part 520, that is, the discharge backward and forward movement member 523, a discharge up and down movement member 533 to move up and down along the discharge up and down movement plate 531, a discharge up and down movement guide rail 535 inserted into the discharge up and down movement member 533, and a discharge up and down movement driving unit 537 to drive the discharge up and down movement guide rail 535.

Therefore, the discharge conveyer belt 51 not only may move left and right, but also may move to the front portion or the rear portion of the body 3. The discharge conveyer belt 51 may move up and down to the upper and lower portions of the body 3.

Meanwhile, the body 3 is provided at the lower portion thereof with a discharge hopper 52 to discharge a wound drug package roll R1 discharged through the discharge conveyer belt 51, and a discharge guide member 53 rotatably provided under the discharge hopper 52 to guide the discharge direction of the wound drug package roll R. A correctively-wound drug package roll box 55 and an erroneously-wound drug package roll box 57 are located under one side and an opposite side of the discharge conveyer belt 51, respectively. The correctively-wound drug package roll box 55 receives a correctively-wound drug package roll R2 discharged when the information recognized by the barcode reader 17 is matched with previously input information. The erroneously-wound drug package roll box 57 receives an erroneously-wound drug package roll R3 discharged when the information recognized by the barcode reader 17 is mismatched with the previously input information.

In detail, if the wound drug package roll R separated from the drug bobbin part 21 is dropped, the discharge backward and forward movement part 520 and the discharge up and down movement part 530 are driven to be located at a proper position, so that the wound drug package roll R is seated on the top surface of the discharge conveyer belt 51. As shown in drawings, if the discharge backward and forward movement part 520 and the discharge up and down movement part 530 are driven to be moved right, the wound drug package roll R dropped to the discharge hopper 52 from the discharge conveyer belt 51 rotates the discharge guide member 53 according to the information recognized by the barcode reader 17, so that the wound drug package roll R is introduced into the correctively-wound drug package roll box 55 or the erroneously-wound drug package roll box 57.

Accordingly, since the wound drug package roll R introduced into the correctively-wound drug package roll box 55 is suitable for a patient, the correctively-wound drug package roll box 55 is sent to the patient. In the case of the wound drug package roll R introduced into the erroneously-wound drug package roll box 57, the erroneous part of the wound drug package roll R is re-checked.

In addition, when the wound drug package roll R is discharged to the outside of the body 3, the discharge conveyer belt 51 is moved to the rear portion of the body 3 by the discharge backward and forward movement part 520, and the height of the discharge conveyer belt 51 is aligned in line with the position of the outlet port 4*a* of the body 3 by the discharge up and down movement part 530, so that the discharge conveyer belt 51 is driven left.

In addition, as shown in FIG. 6*b*, when the drug package P is recognized as an erroneous package, so that the drug package P is not wound, but instantly discharged, the discharge conveyer belt 51 is aligned in line with the outlet port 4*b* of the body 3 and the introduction plate 11, and the drug package P introduced onto the introduction plate 11 is introduced into the discharge conveyer belt 51, so that the drug package P may be discharged to the outlet port 4*b* of the body 3.

FIGS. 7 to 11 are views showing the winding procedure of the drug package by the drug package winding apparatus according to the present invention.

Hereinafter, the winding procedure of the drug package by the drug package winding apparatus according to the present invention will be described in detail with reference to accompanying drawings.

Figure 7:
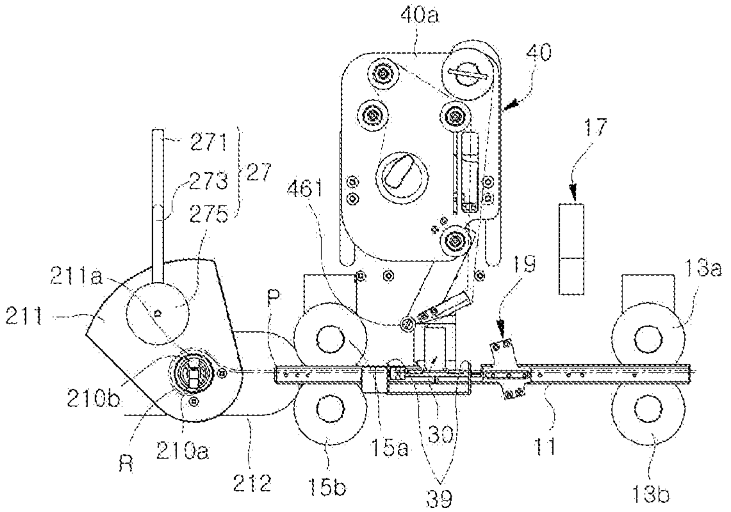
FIGS. 7 to 11 are views showing the winding procedure of the drug package by the drug package winding apparatus according to the present invention.

First, as shown in FIG. 7, a drug package P packaged with a dose of drugs is introduced into the inlet port 4*a* of the body 3 so that the drug package P is introduced onto the introduction plate 11.

The drug package P introduced onto the introduction plate 11 is inserted between the first and second winding members 210*a* and 210*b* located at the same height as that of the introduction plate 11. In this case, referring to FIG. 3*a* again, the second winding member 210*b* of the first and second winding members 210*a* and 210*b* is lifted by the leaf-spring member 213.

In this case, the position sensing member 259*a* of the bobbin position sensor 259 is drawn to the drug package introducing position 259*c*. Accordingly, the first and second winding members 210*a* and 210*b* are drawn to the front portion of the separator 3*a* of the body 3 by the bobbin backward and forward movement part 25.

Referring to FIG. 3*b* again, if the drug package P is introduced, the drug bobbin part 21 is moved backward by the bobbin backward and forward movement part 25 so that the first and second winding members 210*a* and 210*b* of the drug package winding unit 20 are parallel to each other, and the position sensing member 259*a* is located at the drug package introducing position 259*c*.

Then, the drug bobbin part 21 is moved to the rear portion of the body 3. Simultaneously, the first winding member 210*a*, which is moved up, presses the leaf-spring member 213 through the winding hole 211*a* of the winding hole member 211 while being moved down.

Thereafter, if the bobbin rotating part 23 is driven, the drug bobbin part 21 is rotated, so that the drug package P is wound around the outer portions of the first and second winding members 210*a* and 210*b*.

In this case, the barcode reader 17 installed on the introduction plate 11 recognizes the information of the drug received in the drug package P introduced onto the introduction plate 11 and the information of the related patient.

Figure 8:
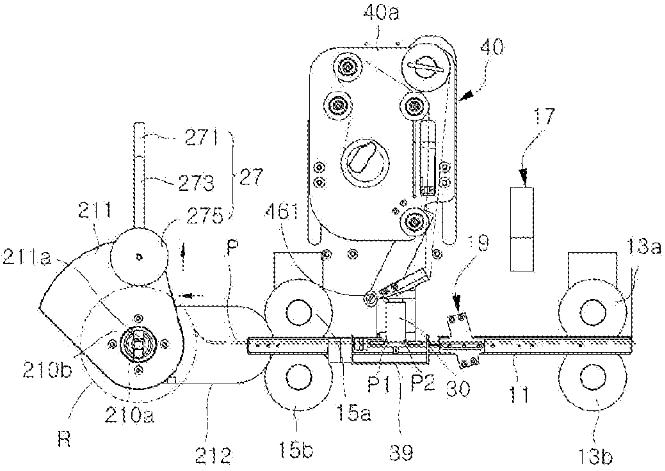

As shown in FIG. 8, if the size of the wound drug package roll R is gradually increased as the drug package P is wound, the bobbin left and right movement part 26 moves the drug bobbin part 21 far away from the introduction plate 11 so that the space, in which the drug package P may be wound, is ensured.

Further, as the diameter of the wound drug package roll R is increased, the winding guiding part 27 guides the winding of the drug package P in such a manner that the winding guide member 273 and the winding guide roller 275 are moved up along the winding guide hole 271 while making contact with the wound drug package roll R which continuously rotates.

In addition, as the diameter of the wound drug package roll R is increased, the outer diameter of the wound drug package roll R is increased. Accordingly, the winding speed sensor 28, that is, the winding position sensing member 281 provided at the winding guide member 273 is introduced into the tensile force adjustment position members 283, which are installed above, so that the light emitting part is introduced into the light receiving part. In this case, the rotational speed of the drug bobbin part 21 is decreased, so that the drug package P is slowly wound at a low speed corresponding to the increased length of the outer diameter.

In this case, if the patient information recognized by the barcode reader 17 is the information of another patient, the driving of the drug bobbin part 21 and the introducing and withdrawing rollers 13 and 15 is stopped.

In addition, the cutter part 31 of the drug package cutting unit 30 is drawn to the introduction plate 11 by the cutting movement member 33 and the circle cutter 311 of the cuter part 31 rotates while cutting the boundary between one-side drug pack P1 and an opposite-side drug pack P2.

Figure 9:
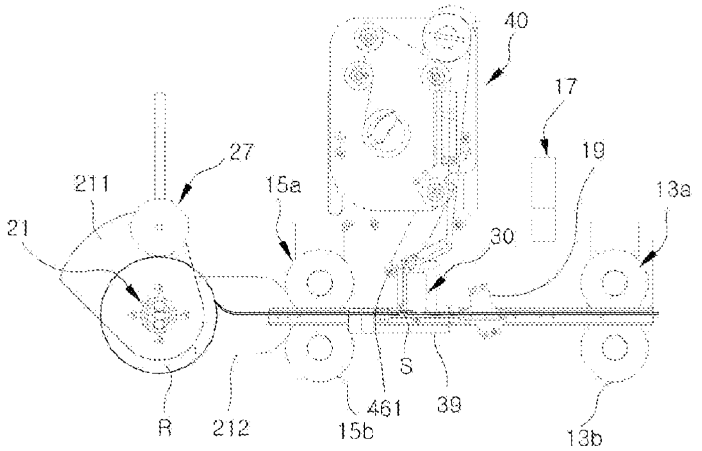

Then, as shown in FIG. 9, the release paper E having the sticker S attached thereto is unwound from the sticker winding roller which is installed at the wound sticker roll installing part 41 of the sticker attaching unit 40. The unwound release paper E is moved to the bottom surface of the inclined separation guiding part 45 and the sticker S is separated from the release paper E. The separated sticker S is dropped and attached to the end portion of the one-side drug pack P1. The release paper E without the sticker S is transferred up and wound around the wound release paper roll installing part 47.

Figure 10:
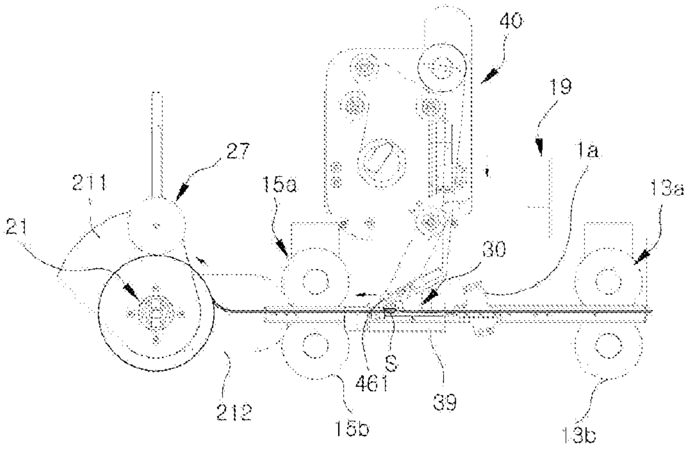

Next, as shown in FIG. 10, the sticker attaching unit 40 is moved down, the drug bobbin part 21 is re-driven to rotate, and the attaching roller 461 installed at the end portion of the separation guiding part 45 rotates while pressing the sticker S attached to the end portion of the drug package P so that the sticker S can be firmly attached to the end portion of the drug package P.

Figure 11:
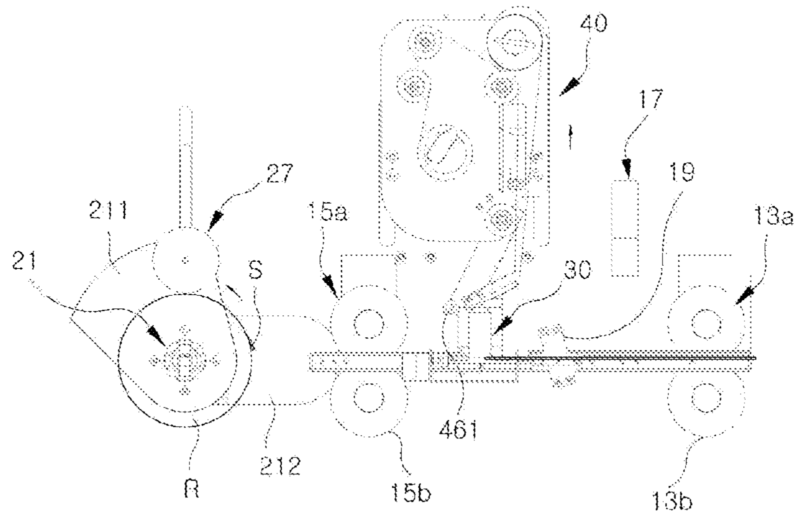

Then, as shown in FIG. 11, the drug package P having the end portion attached with the sticker S is wound and the sticker S is attached to the outer surface of the wound drug package roll R, thereby preventing the wound drug package roll R from being released, so that the drug package P is bundled for each patient.

Next, as the bobbin backward and forward movement part 25 is moved to the rear portion of the separator 3*a*, the wound drug package roll R around the drug bobbin part 21 is separated from the drug bobbin part 21 and seated on the discharge conveyer belt 51. In this case, the position sensing member 259*a* of the bobbin backward and forward movement part 25 is located at a rear bobbin position 259*b*.

In this case, referring to FIG. 6*a* again, the wound drug package roll R seated on the discharge conveyer belt 51 is introduced into the discharge hopper 52 from the discharge conveyer belt 51 if the information of the patient recognized by the barcode reader 17 is matched with the previously-input information of the patient. The discharge guide member 53 installed at the side of a discharge port of the discharge hopper 52 rotates in such a manner that the discharge hopper 52 communicates with the matching storage box, so that the wound drug package roll R is introduced into the correctively-wound drug package roll box 55.

On contrast, if the information of the patient recognized by the barcode reader 17 is matched with the previously-input information of the patient, the discharge guide member 53 rotates in an opposite direction, so that the wound drug package roll R is introduced into the erroneously-wound drug package roll box 57.

The wound drug package roll R introduced into the correctively-wound drug package roll box 55 may be sent to the patient, or may be safely transferred to the residence of the patient. The wound drug package roll R introduced into the erroneously-wound drug package roll box 57 may be re-checked by a worker.

In addition, referring to FIG. 6*b* again, the discharge conveyer belt 51 is moved backward and forward or moved up and down, so that the position of the discharge conveyer belt 51 is installed to link the introduction plate 11 with the outlet port 4*a* of the body 3, so erroneous drug packages P such as a drug package having the erroneously-written information of a patient or a drug package, in which wrong drugs are packaged, are drawn to the outside of the body 3 through the outlet port 4*a*. Accordingly, a worker may re-handle the erroneous drug packages P.

Therefore, according to the drug package winding apparatus of the present invention, a drug package, which is formed by making a drug pack having a dose of drugs and consecutively linking drug packs with each other, is wound according to patients, an end portion of the drug package is cut, and a sticker is attached to the drug package. Accordingly, a drug package based of the prescription of each patient is wound so that a great amount of drugs can be easily transferred to the patient, and the patient can easily carry the drug package.

[Industrial Applicability]

As described above, according to the present invention, the drug package, which is formed by making a drug pack having a dose of drugs and consecutively linking drug packs with each other, is wound according to patients, an end portion of the drug package is cut, and the sticker is attached to the drug package. Accordingly, the drug package based of the prescription of each patient is wound so that a great amount of drugs can be easily transferred to the patient.

In particular, according to the present invention, as the drug package is automatically introduced, so that the drug package is wound, the drug package can be automatically introduced into the drug package winding unit.

Further, according to the present invention, as the barcode reader is provided so that the information of the drug package can be recognized, the drug package can be wound according to the patients.

Further, as the drug bobbin part, which winds the drug package, is moved forward and rotated, if the drug package is introduced, the drug bobbin part can be rotated to automatically wind the drug package.

Further, according to the present invention, as the space between the two winding members is horizontally arranged at the same height as that of the position in which the drug package is introduced, the drug package can be inserted between the two winding members constituting the drug bobbin part without additional equipment.

In addition, according to the present invention, the drug bobbin part can be installed movably backward or forward, the drug package can be introduced between two winding members, the drug bobbin part can wind the drug package while rotating, and the wound drug package can be separated from the drug bobbin part.

In addition, according to the present invention, as the drug bobbin part is moved backward or forward, and the detecting sensor is provided to detect the position of the drug bobbin part, the drug bobbin part can be constantly moved to an exact position.

Further, according to the present invention, as the winding guide roller is provided at the drug bobbin part to guide the winding of the drug package, the drug package can be stably wound around the drug bobbin part.

In addition, according to the present invention, the outer diameter of the wound drug package is increased if the thickness of the wound drug package roll wound around the drug bobbin part is increased. Accordingly, the moving-up of the wound guide member is detected to detect the thickness of the wound drug package roll, thereby adjusting the rotational speed of the drug bobbin part so that the winding speed of the drug package is decreased corresponding to the thickness of the wound drug package roll. Accordingly, the drug package can be prevented from being damaged while the drug package is being wound.

Further, according to the present invention, as the left and right movement part is provided to move the winding guide roller left or right, the winding guide roller is moved to one side suitably for the thickness of the wound drug package roll wound around the drug bobbin part, so that the winding space can be ensured, and the winding of the drug package can be guided.

In addition, according to the present invention, the end portion of the drug package is cut, and the position in which the cutting movement guide rail is drawn or returned can be exactly guided by a cutting position guide sensor and a restoration position guide sensor.

Further, according to the present invention, as the circle cutter is provided, when the cutter is drawn or returned, the end portion of the drug package can be simply cut.

In addition, according to the present invention, when the circle cutter is drawn, the cutting guide part is provided so that the circle cutter is constantly drawn to a predetermined position. Accordingly, the drug package can be constantly cut at an exact position.

Further, according to the present invention, the cutting fixing part to fix the position of the drug package when the circle cutter cuts the drug package is provided. When the circle cutter is drawn, the drug package can be prevented from being out of the position thereof, and can be prevented from being damaged.

In addition, according to the present invention, as the bonding part detecting sensor is provided to detect the bonding part of the drug package, the boundary between the drug packages is exactly cut, so that the drugs received in the drug package or the wrapping paper can be prevented from being damaged.

Further, according to the present invention, as the cutter cover member is provided to cover the upper portion of the circle cutter, when the circle cutter is rotated, the safety accident can be prevented from occurring due to the a part that does not make contact with the drug package.

In addition, according to the present invention, as the sticker attaching unit is located above the drug package cutting unit, the sticker is dropped and attached to the end portion of the wound drug package without an additional device, and the top surface of the attached sticker is pressed, so that the sticker can be firmly attached to the end portion of the drug package. Accordingly, the bundle of the wound drug package roll having a fixed end portion can be obtained.

In addition, according to the present invention, as the convey belt, which can be driven bi-directionally, is provided, and the discharge conveyer belt is moved backward and forward or up and down, the wound drug package roll can be selectively discharged to the outside or the lower portion thereof.

In addition, according to the present invention, the wound drug package rolls can be discharged by distinguishing between a wound drug package roll matched with previously-input information and a wound drug package roll mismatched with the previously-input information. Accordingly, the erroneously-wound drug package can be sorted out.

The invention claimed is:

1. A drug package winding apparatus comprising:

a drug package introducing unit to introduce a drug package, which is formed by packaging an amount of drugs in a unit of a single pack having a dose of drugs and is not individually divided into single packs, into a body;

a drug package winding unit to wind the drug package introduced into the drug package introducing unit;

a drug package cutting unit to cut a space between one side pack and an opposite side pack of the drug package wound by the drug package winding unit; and a sticker attaching unit to attach a sticker to an end portion of the drug package cut by the drug package cutting unit, wherein the drug package winding unit comprises:

a drug bobbin part installed at one side of the drug package introducing unit, one side of the drug package being inserted into the drug bobbin part such that the drug package is wound around an outer surface of the drug bobbin part;

a bobbin rotating part to rotate the drug bobbin part; and a bobbin backward and forward movement part to move the drug bobbin part forward or backward.

2. The drug package winding apparatus of claim 1, wherein the bobbin backward and forward movement part comprises:

a backward and forward seating plate on which the drug bobbin part is seated;

a backward and forward movement guide rail coupled with the backward and forward seating plate to guide movement of the backward and forward seating plate;

a backward and forward movement pulley unit to rotate the backward and forward movement guide rail; and a backward and forward driving unit to drive the backward and forward movement pulley unit.

3. The drug package winding apparatus of claim 2, wherein the drug bobbin part comprises:

a bobbin housing provided therein with one sides of two winding members that are arranged up and down;

a leaf-spring member installed at a lower winding member located lower than an upper winding member of the two winding members, which is installed rotatably upward, to return the upper winding member such that the upper winding member is rotated, or to press the upper winding member such that the upper winding member is parallel to the lower winding member; and a winding hole member formed therein a winding hole to press the upper winding member such that the upper winding member, which is drawn to a front portion of the body, is parallel to the lower winding member when the drug bobbin part is moved to the front portion of the body.

4. The drug package winding apparatus of claim 3, further comprising a bobbin position sensor provided at one side of the backward and forward movement guide rail to guide a moving position of the drug bobbin part, wherein bobbin position sensors are installed at an insertion position, where the one side of the drug package is inserted between the upper and lower winding members as the drug bobbin part is provided at the front portion of the body and the upper winding member is moved up;

a winding position where the drug package is wound around outer portions of the upper and lower winding members as the drug bobbin part is moved to a rear portion of the body by a predetermined interval and the upper and lower winding members are parallel to each other; and a separation position where a wound drug package roll is separated from the upper and lower winding members of the drug bobbin part as the drug bobbin part is moved to the rear portion of the body.

5. The drug package winding apparatus of claim 1, further comprising a winding guide member provided at one side of the drug bobbin part and having a winding guide roller provided at an end portion thereof to guide winding of the drug package inserted between upper and lower winding members and wound around the upper and lower winding members, such that the winding guide member is moved up according to a thickness of the wound drug package.

6. The drug package winding apparatus of claim 1, wherein the drug bobbin part comprises a bobbin left and right movement part allowing the drug bobbin part to move left or right to maintain a predetermined distance from the drug package introducing unit as a thickness of the drug package wound around upper and lower winding members is increased, and wherein the bobbin left and right movement part comprises:

a left and right movement seating plate on which the drug bobbin part is seated;

a left and right movement guide rail coupled with the left and right movement seating plate to guide movement of the left and right movement seating plate;

a left and right movement pulley unit to rotate the left and right movement guide rail; and a left and right movement driving unit to drive the left and right movement pulley unit.

7. The drug package winding apparatus of claim 1, wherein the drug package cutting unit comprises:

a cutter part to divide one-side pack and an opposite-side pack of the drug package from each other;

a cutting movement member provided at a front portion thereof with the cutter part such that the cutting movement member is drawn from an inner part of the body to a front portion of the body;

a cutting movement guide rail having the cutting movement member seated thereon to guide movement of the cutting movement member;

a cutting movement pulley part to fix an opposite side of the cutting movement member thereto such that the cutting movement member is moved forward and backward; and a cutting driving pulley part driven by a cutting driving unit such that the cutting driving pulley part is coupled with the cutting movement pulley part to drive the cutting movement pulley part.

8. The drug package winding apparatus of claim 7, further comprising a cutting position guiding sensor and a return position guiding sensor provided at an inside and a front side of the cutting movement guide rail, respectively, to guide a moving position of the cutting movement member, wherein the cutter part comprises:

a circle cutter;

cutter support members having diameters smaller than a diameter of the circle cutter and making contact with both lateral sides of the circle cutter to support rotation of the circle cutter;

a cutter rotating shaft passing through center parts of the circle cutter and the cutter support member such that the circle cutter is rotatable; and a cutter fixing member provided at a front portion thereof with a rotation support member to support both ends of the cutter rotating shaft, and fixed to a front portion of the cutting movement member at a rear portion.

9. The drug package winding apparatus of claim 8, wherein the cutter part comprises a cutting guide part provided at a front portion of the body to guide drawing of the circle cutter to a predetermined position when the circle cutter is drawn to the front portion of the body, and wherein the cutting guide part comprises:

an incised groove such that the circle cutter is inserted into the incised groove when the cutter part is drawn to the front portion of the body; and a cutting guide member having an inclined surface lowered toward the front portion of the body such that the circle cutter is inserted into the incised groove.

10. The drug package winding apparatus of claim 8, wherein the cutter part further comprises a cutting fixing part to fix a position of the drug package such that the drug package is prevented from being out of the position thereof due to an operation of the cutter part when the cutter part cuts the drug package, and wherein the cutting fixing part comprises:

at least two position fixing members to fix both sides of the drug package to be cut;

a fixing member rotating shaft to rotate the position fixing members; and a fixing member driving unit to rotate the fixing member rotating shaft.

11. The drug package winding apparatus of claim 1, wherein the sticker attaching unit comprises:

a wound sticker roll installing part installed in a sticker attaching unit installing part and above the drug package cutting unit to unwind a wound sticker roll formed by winding a release paper to which stickers having a predetermined size are consecutively attached;

a plurality of guiding rollers to guide unwinding of the release paper having the stickers attached thereto from the wound sticker roll in the wound sticker roll installing part;

a separation guiding part allowing the stickers to be separated from the release paper; and a wound release paper roll installing part to wind the release paper.

12. The drug package winding apparatus of claim 11, wherein the separation guiding part is located at an upper portion of the drug package cutting unit, and inclined such that one side of the separation guide part is located at an upper portion of the drug package while being located under the guide roller to be closer to the upper portion of the drug package than an opposite side of the separation guide part.

13. The drug package winding apparatus of claim 11, wherein the sticker attaching unit comprises an up and down movement part for a sticker attaching operation to move the sticker attaching unit installing part up and down, and wherein the up and down movement part for the sticker attaching operation comprises:

a sticker attaching unit up and down movement member coupled with the sticker attaching unit installing part to move the sticker attaching unit installing part up and down;

a sticker attaching unit guide member inserted into the sticker attaching unit up and down movement member to move the sticker attaching unit up and down movement member up and down; and a sticker attaching unit driving unit to drive the sticker attaching unit guide member to move the sticker attaching unit up and down movement member up and down.

14. The drug package winding apparatus of claim 1, wherein the body comprises a drug package discharge unit to discharge the drug package to which the sticker is attached by the sticker attaching unit, and wherein the drug package discharge unit comprises:

a discharge conveyer belt, on which a wound drug package roll wound by the drug package winding unit and having the sticker attached thereto by the sticker attaching unit, is seated, a driving direction of the discharge conveyer belt being changed to one side or an opposite side such that the wound drug package roll is discharged to a lower side of the body or an outside of the body;

a discharge backward and forward movement part to move the discharge conveyer belt backward and forward; and a discharge up and down movement part to move the discharge backward and forward movement part up and down.

15. The drug package winding apparatus of claim 14, further comprising:

a discharge hopper provided under the discharge conveyer belt to discharge the wound drug package roll discharged through the discharge conveyer belt;

a discharge guide member rotatably provided under the discharge hopper to guide a discharge direction of the wound drug package roll;

a correctively-wound drug package roll box provided under the one side of the discharge conveyer belt to receive a correctively-wound drug package roll discharged when information recognized by a barcode reader is matched with previously input information; and an erroneously-wound drug package roll box provided under the opposite side of the discharge conveyer belt to receive an erroneously-wound drug package roll discharged when the information recognized by the barcode reader is mismatched with the previously input information.

* * * * *